No. 818,098. PATENTED APR. 17, 1906.
J. S. KEMP.
FERTILIZER DISTRIBUTER.
APPLICATION FILED APR. 4, 1905.
5 SHEETS—SHEET 1.
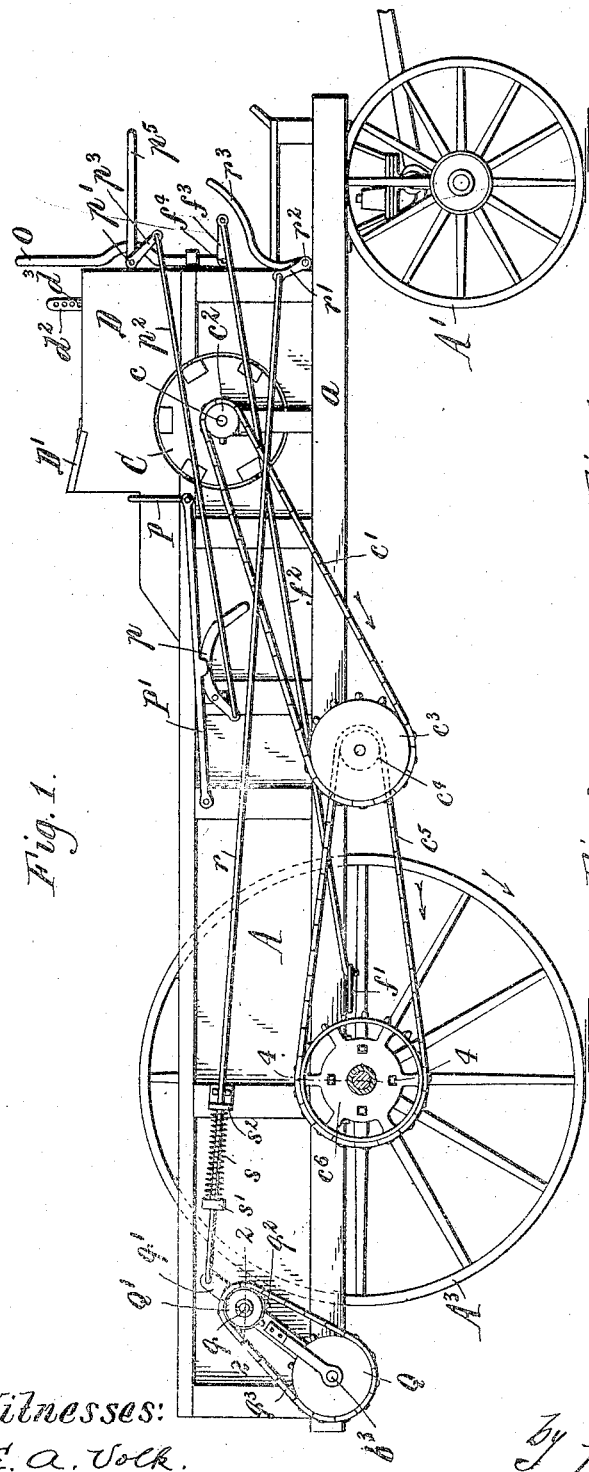
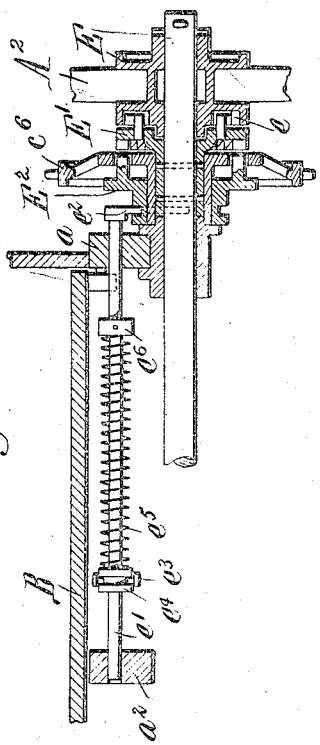
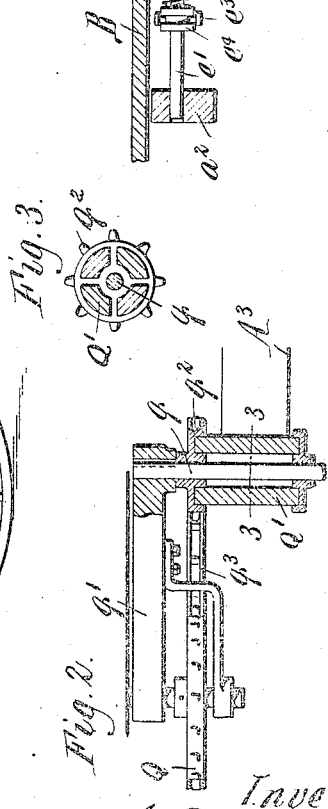
Witnesses:
E. A. Volk.
N. W. Rimun
Inventor:
J. S. Kemp
By Wilhelm, Parker & Hard
Attorneys.

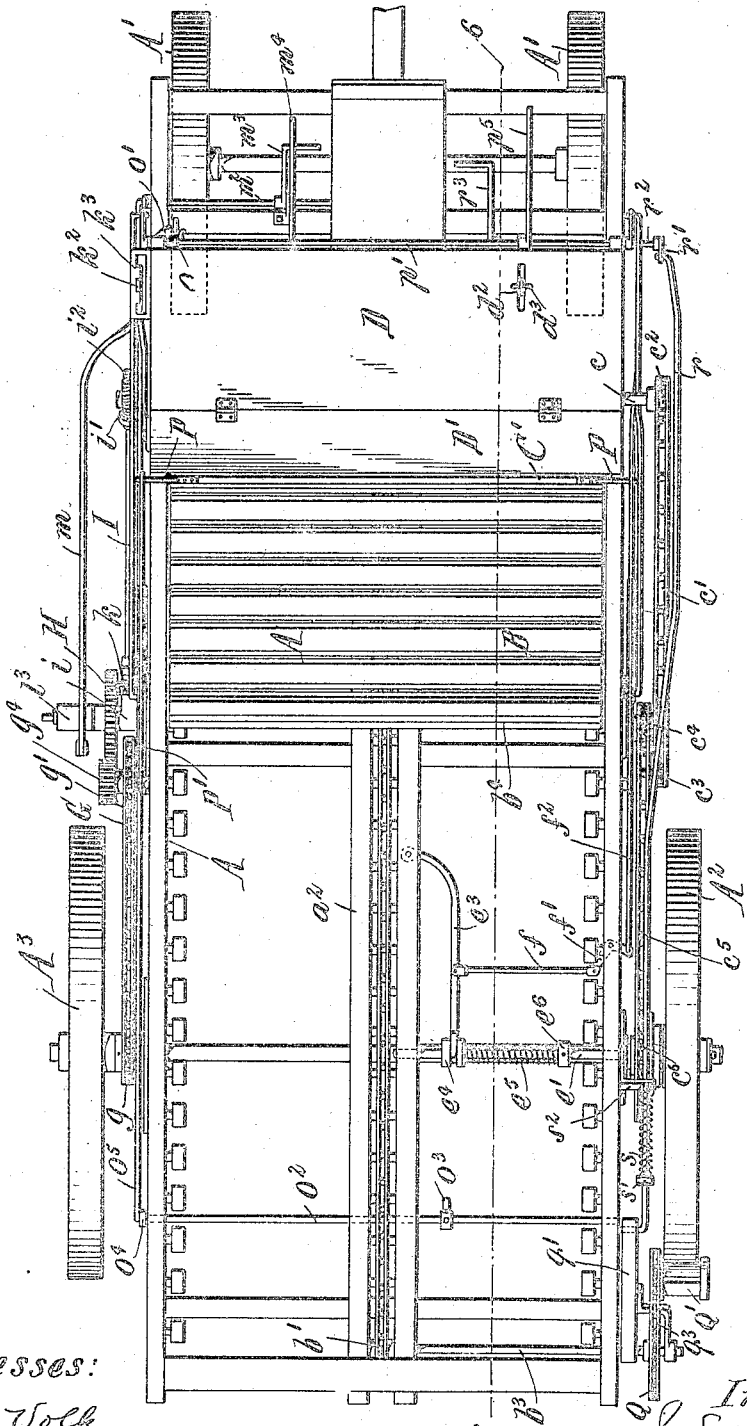

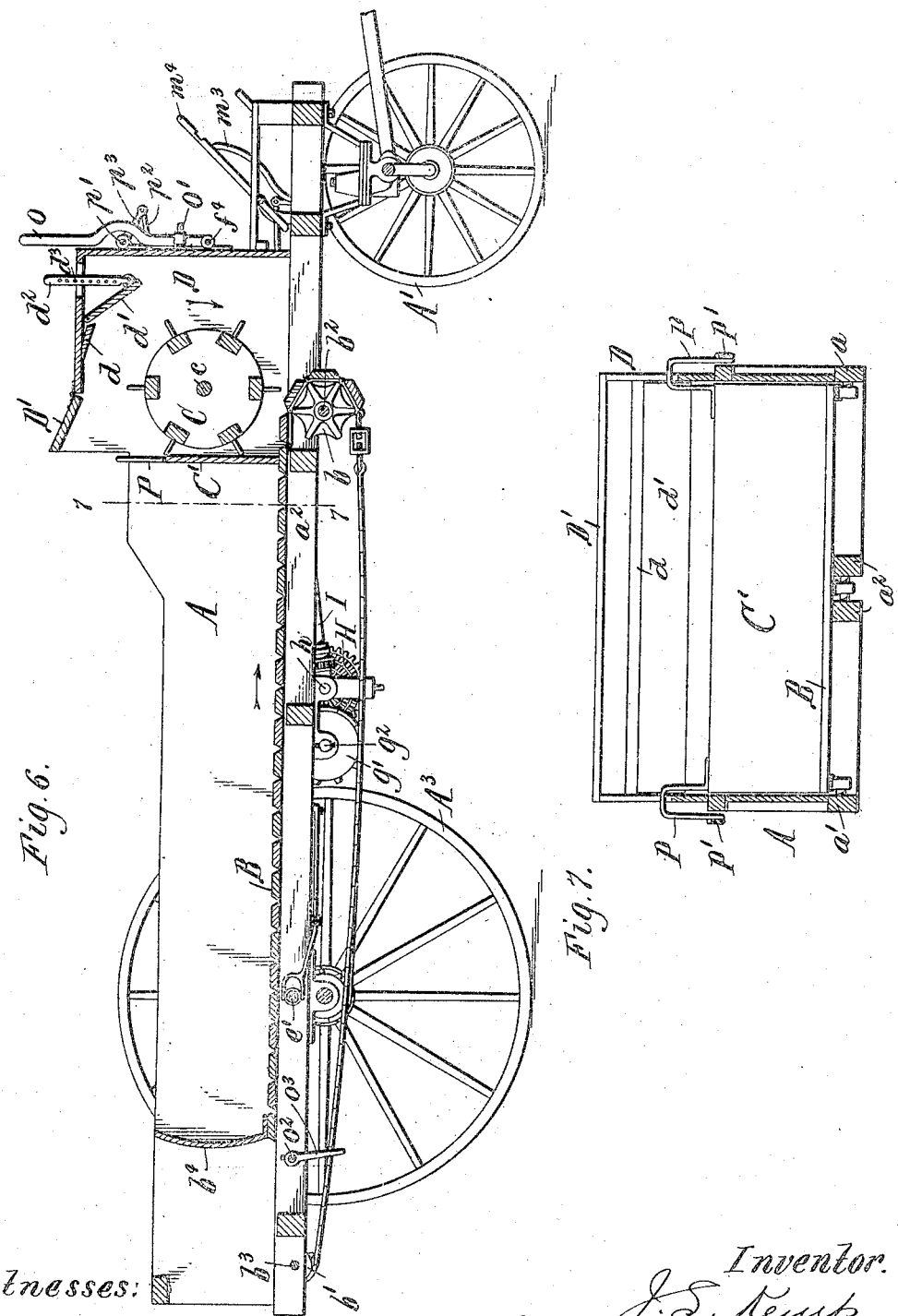

No. 818,098. PATENTED APR. 17, 1906.
J. S. KEMP.
FERTILIZER DISTRIBUTER.
APPLICATION FILED APR. 4, 1905.
5 SHEETS—SHEET 4.
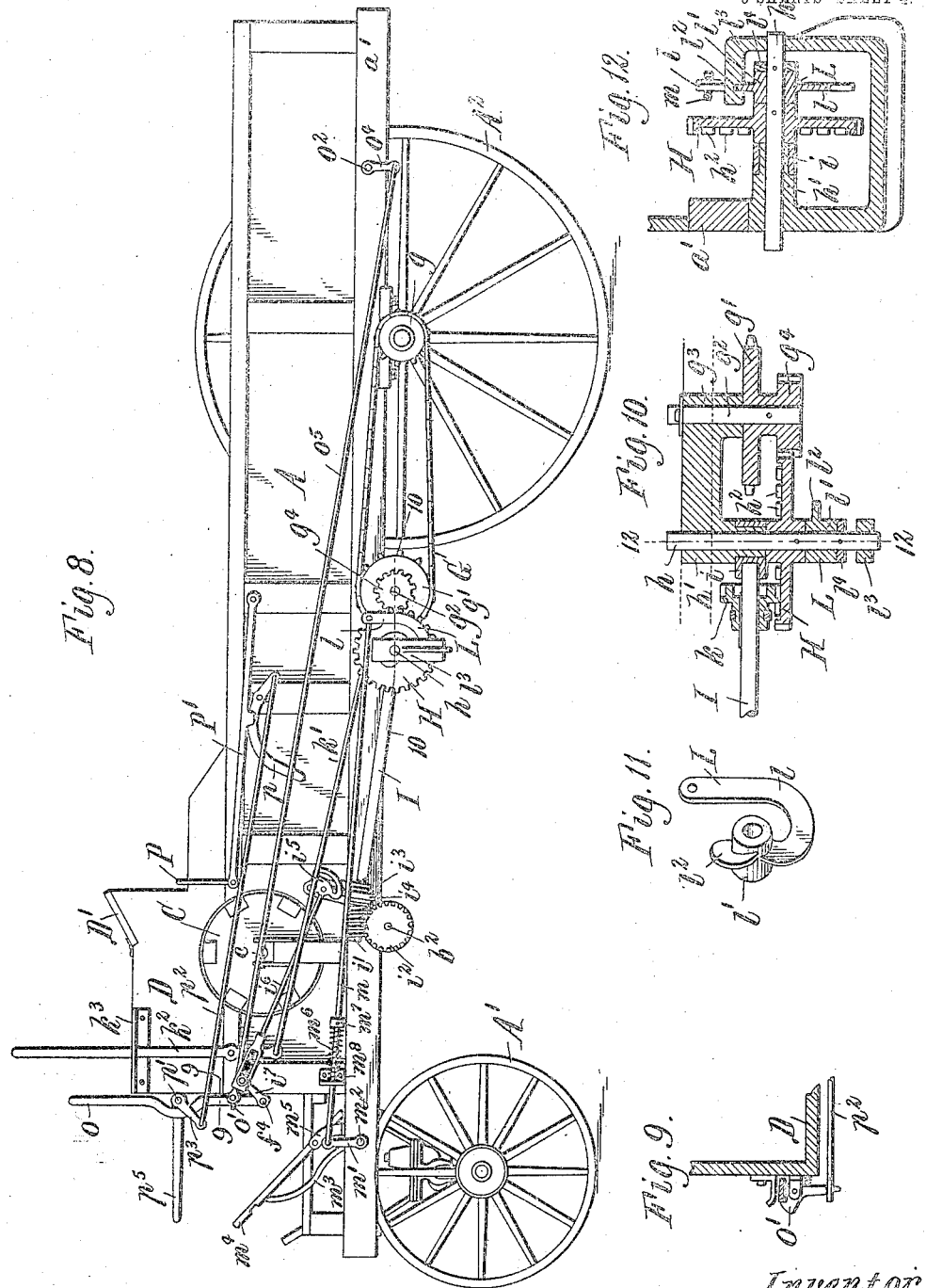
Witnesses:
E. A. Volk.
R. W. Rumsur
Inventor.
J. S. Kemp
by Wilhelm, Parker & Hard,
Attorneys.

No. 818,098. PATENTED APR. 17, 1906.
J. S. KEMP.
FERTILIZER DISTRIBUTER.
APPLICATION FILED APR. 4, 1905.
5 SHEETS—SHEET 5.
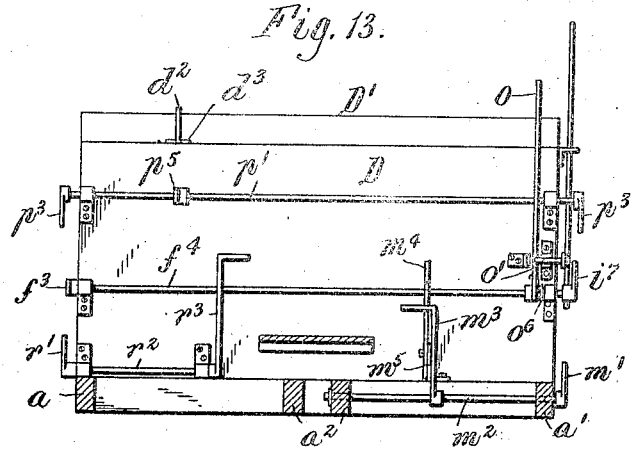
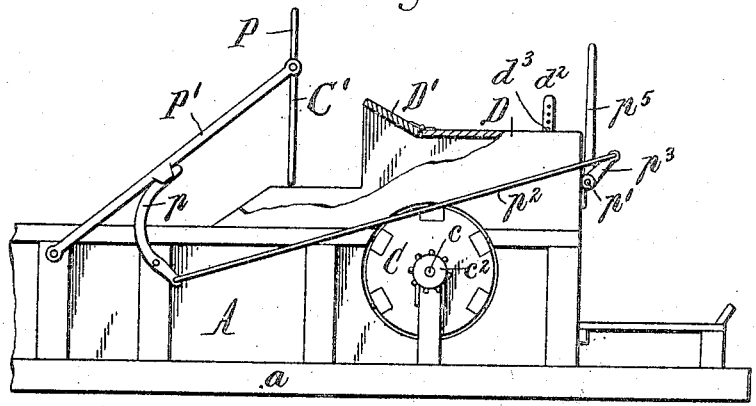
Witnesses:
E. A. Volk.
Inventor.
J. S. Kemp
by Wilhelm, Parker and Hard
Attorneys.

UNITED STATES PATENT OFFICE.

JOSEPH S. KEMP, OF NEWARK VALLEY, NEW YORK.

FERTILIZER-DISTRIBUTER.

No. 818,098. Specification of Letters Patent. Patented April 17, 1906.

Application filed April 4, 1905. Serial No. 253,818.

*To all whom it may concern:*

Be it known that I, JOSEPH S. KEMP, a citizen of the United States, residing at Newark Valley, in the county of Tioga and State of New York, have invented a new and useful Improvement in Fertilizer-Distributers, of which the following is a specification.

This invention relates to that class of fertilizer-distributers or manure-spreaders which comprise a box or receptacle for the material to be distributed and a rotary or other movable beater or disintegrator to which the material in the box or body is slowly fed and by which the material is distributed or delivered.

My invention has for its main object to construct and arrange the beater or disintegrator mechanism in such manner that the beater is located in the front portion of the machine and the fertilizer in the box or receptacle is fed forwardly to the beater and removed by the latter from the front end of the box or receptacle in an upward direction and delivered downwardly from the front portion of the beater, whereby the operation of spreading is greatly improved and can be better controlled by the operator.

Another object of the invention is to provide the machine with a simple and efficient mechanism for returning the feed-apron or movable slat bottom to its initial position when the load has been discharged.

In the accompanying drawings, consisting of five sheets, Figure 1 is an elevation of the right-hand side of the machine with the right-hand rear wheel removed. Fig. 2 is a sectional elevation of the return mechanism for the apron in line 2 2, Fig. 1, on an enlarged scale. Fig. 3 is a cross-section through the driving-roller in line 3 3, Fig. 2. Fig. 4 is a fragmentary vertical section of the beater-clutch mechanism in line 4 4, Fig. 1. Fig. 5 is a top plan view of the machine. Fig. 6 is a longitudinal section of the machine in line 6 6, Fig. 5. Fig. 7 is a cross-section in line 7 7, Fig. 6. Fig. 8 is an elevation of the left side of the machine with the rear wheel removed. Fig. 9 is a fragmentary horizontal section in line 9 9, Fig. 8, on an enlarged scale, showing the spring-catch for holding the lever which controls the apron-feed and beater-drive mechanisms. Fig. 10 is a fragmentary horizontal section in line 10 10, Fig. 8, on an enlarged scale. Fig. 11 is a perspective view of the cam-lever for shifting the disk wheel of the apron-feed mechanism. Fig. 12 is a vertical section in line 12 12, Fig. 10. Fig. 13 is a sectional front elevation of the box or body. Fig. 14 is a fragmentary sectional elevation showing the front gate raised.

Like letters of reference refer to like parts in the several figures.

A represents the box or receptacle which receives the fertilizing material to be distributed and which is mounted upon a front running-gear, to which the draft is applied, and a rear running-gear, from which the several mechanisms of the machine are driven. $a$ represents the right-hand bottom sill, $a'$ the left-hand sill, and $a^2$ the central sills, of the box or receptacle. $A'$ represents the front wheels, $A^2$ the right-hand rear wheel, and $A^3$ the left-hand rear wheel.

B represents the movable slat bottom or feed-apron, which is carried around front and rear sprocket-wheels $b$ $b'$, mounted, respectively, on transverse shafts $b^2$ $b^3$. This apron is so operated as to move with its upper portion forwardly in the box or receptacle and is provided at its rear end with a follower $b^4$, Fig. 6.

C represents the beater or disintegrator, which is arranged in the front portion of the machine and which is so operated as to remove the fertilizing material from the front of the load on the feed-apron and deliver it downwardly in front of the latter. This beater is arranged in a hood or casing D, which is open at the rear and extends forwardly over the beater and downwardly in front of the beater and opens downwardly between the sills $a$ $a'$ for the delivery of the material.

An upright safety-board $C'$ is arranged in rear of the beater to separate the latter from the load while placing the material in the box. This board is movable up and down and is moved up to expose the beater before starting the feed movement of the apron and is moved down to separate the beater from the material before beginning to place the latter in the box. In moving the board upwardly the same is liable to be pressed by the load against the rear end of the hood, and in order to enable the board to move freely upward in all circumstances the rear top portion $D'$ of the hood is hinged to the top portion, Figs. 1, 6, and 8, in such manner as to allow this portion of the hood to move upwardly with the safety-board if the latter should be pressed against the rear end of the hood.

The hood is preferably provided above the beater with a fixed deflecting board or plate $d$, which deflects the material forwardly and downwardly and in front of this fixed deflector with a movable deflector $d'$ for further deflecting the material downwardly. This movable deflector is hinged at its rear end to the top of the hood and is adjustable up and down at its front end for changing its angle by an adjustable rod $d^2$, held in position by a pin $d^3$ or other suitable means. The material striking this movable deflector causes the latter to vibrate up and down, whereby the material is prevented from adhering to and accumulating on the deflector.

The beater rotates with its rear portion upwardly, whereby the fertilizer is removed from the front end of the load in an upward direction, which is important when operating upon manure or other moist material, because it tends to loosen and disintegrate the material instead of compacting or packing the same. The material so removed from the load by the beater is controlled by the hood and directed forwardly over the beater and downwardly from the front portion of the beater to the ground. This front delivery has many important advantages, among them the following: The delivery is much better under the control of the driver than when it takes place at the rear end of the machine, because the rear end is more liable to move out of the true line, especially when spreading on ground which is not level—for instance, on a sidehill. The front delivery, therefore, permits of a close joining of the work and is better adapted for drilling, because the driver can see the chutes and guide the machine better to deliver into the drills. As the load becomes smaller during the operation of spreading, the rear portion of the machine becomes lighter, which eases the work of the team on uneven ground. The spreading is better controlled in windy weather, as the wind is less liable to interfere with the proper delivery and to deflect the delivered material sidewise than in a rear-delivery machine. The beater mechanism can be fully inclosed by a hood for controlling the delivery, and the hood is protected against injury in moving the machine about in the barn or yard. The spreading can be extended more nearly to the end of the field or fence, whereby the uncovered portions or headlands on the field are considerably reduced.

The beater may be of any suitable construction and may be driven by any suitable mechanism. As shown in the drawings, it is mounted upon a transverse rotary shaft $c$, which is driven on the right-hand side of the machine, Figs. 1 and 5, by a drive-chain $c'$, running around a sprocket-pinion $c^2$ on the beater-shaft, and an intermediate sprocket-wheel $c^3$, carrying on its inner side a pinion $c^4$, which is driven by a chain $c^5$ from a sprocket-wheel $c^6$ on the rear axle. The sprocket-wheel $c^6$ is loosely mounted on the rear axle and is driven from the ground-wheel $A^2$ by any suitable means, preferably by that shown in my Letters Patent No. 779,713, dated January 10, 1905. This mechanism is represented in Fig. 4 and is composed of the following parts, briefly stated:

E represents the hub of the ground-wheel $A^3$, provided on its rear side with ratchet-teeth $e$, which transmit motion to a pawl-disk $E'$, secured to the axle and having a clutch-face on its rear side. A clutch member $E^2$ is loosely mounted on the hub of the sprocket-wheel $c^6$ and has on its outer side clutch-bars which pass through the sprocket-wheel and engage the pawl-disk, the latter engaging the hub E. The clutch member $E^2$ is thrown into and out of engagement with the pawl-disk $E'$ by a transverse shifting-rod $e'$, Figs. 4 and 5, which is supported slidably in the side sill $a$ and central sill $a^2$ and engages with its outer forked end $e^2$ in an annular groove in the clutch member $E^2$. This shifting-rod is actuated by a horizontal rock-lever $e^3$, pivoted to the central sill $a^2$ and engaging a sliding collar $e^4$ on the shifting-rod, which collar is connected by a spring $e^5$ with a fixed collar $e^6$ on the rod. The rock-lever $e^3$ is actuated by a link $f$, extending to a bell-crank lever $f'$, which is connected by a longitudinal rod $f^2$ to an arm $f^3$ on a transverse shaft $f^4$, arranged in front of the hood D.

As the beater is located in front of the axle from which it is driven, it rotates in the same direction in which the axle rotates. The beater-driving mechanism can therefore be a drive-chain mechanism, which involves no gear-wheels for the reversal of motion and which makes the lower run of each drive-chain the taut or driven side. This reduces the frictional and other resistances of the driving mechanism, simplifies the construction, and renders the mechanism more durable and serviceable.

The movable feed-apron B is preferably driven from the left side of the machine by the following means, Figs. 5, 8 to 12: G represents a drive-chain running over sprocket-wheels $g$ and $g'$, mounted, respectively, on the rear axle and on a stud-shaft $g^2$. The latter is journaled in a bearing $g^3$ and is provided with a gear-wheel $g^4$, preferably formed integral with the sprocket-wheel $g'$. The gear-wheel $g^4$ meshes with the spur-gear face on the periphery of a disk-wheel H, which is mounted on a stud $h$, journaled in a bearing $h'$, and is provided on its inner face with several concentric gear-rims $h^2$. I represents the longitudinal worm-shaft, which is supported at its rear end in a pivoted bearing $i$ and carries at its front end the worm $i'$, which meshes with a worm-wheel $i^2$ on the transverse front shaft $b^2$, by which the movable bottom is driven. The front end of the worm-shaft is vertically movable to disconnect the worm from the worm-wheel when desired. The worm-shaft is mounted for this purpose in rear of the worm in a bearing $i^3$, which is vertically movable in a guide-frame $i^4$ and is raised and lowered by a cam $i^5$, pivoted above said bearing. This cam is actuated by a shifting-rod $i^6$, extending forwardly to an arm $i^7$, secured to the end of the rock-shaft $f^4$. The worm-shaft is driven from the disk wheel H by a pinion $k$, which can be shifted on the worm-shaft to engage either of the concentric gear-rims of the disk wheel, thereby changing the speed of the worm-shaft and of the apron in a well-known manner. The pinion $k$ is shifted by a rod $k'$, which connects the pinion with a hand-lever $k^2$, pivoted on the hood and held in its adjusted position in a notched plate $k^3$. The gear-wheel H is required to be moved outward for disengaging and shifting the pinion $k$ and inward for again engaging the pinion. For this purpose a cam-lever L is provided, Figs. 8, 10 to 12, having a bent arm $l$, extending from its hub $l'$, which is journaled on the stud $h$, and having a spiral cam $l^2$ on the hub. This cam engages in a groove formed in an arm or bracket $l^3$ on the bearing $h'$. The cam-lever L is loosely mounted on the stud $h$ and is arranged between the hub of the disk wheel H and a collar $l^4$, which latter is secured to the stud. The cam-lever is rocked on the stud by any well-known means—for instance, by a connecting-rod $m$, which connects the lever with an arm $m$ on a shaft $m^2$, extending across the front of the machine. A foot-lever $m^3$ is mounted on the shaft $m^2$ and rests against the under side of a locking-lever $m^4$, which latter is pivoted between its ends, preferably near its rear end, on a bracket $m^5$, secured to the upper side of one of the front cross-sills. When the foot-lever $m^3$ is depressed, the laterally-extending foot-piece on the foot-lever engages in a notch in the locking-lever $m^4$, which latter rests against the foot-lever and follows the same in its descent. The foot-lever is thus held locked in position and is released by the driver striking his foot against the rearwardly-extending arm of the locking-lever. A spring $m^6$ surrounds the connecting-rod $m$ and is interposed between a fixed collar $m^7$ on the rod and a bracket $m^8$, secured to the side of the box or body near its front end and through which the rod passes. This spring is compressed when the foot-lever is depressed, and the disk wheel H is moved outwardly, and the spring returns the disk-wheel inwardly when released and also forms a cushion which prevents injury to the gear-teeth.

The rock-shaft $f^4$, which carries at its ends the arms $f^3$ and $i^7$, extends across the front of the hood and controls the beater-driving mechanism and the worm mechanism for driving the feed-apron. This rock-shaft is provided with a hand-lever O, which is raised to a vertical position (shown in Figs. 1, 8, and 13) for starting the beater and the feed-apron. The lever is held in this position by a spring-catch O', Figs. 9 and 13, of ordinary construction. This catch is automatically tripped by the feed-apron in the following manner, $O^2$ represents a transverse rock-shaft which is arranged in the rear portion of the machine and carries an arm $O^3$, which extends downwardly into the path of the lower run of the apron. An arm $O^4$ is secured to the outer end of this rock-shaft on the left side of the machine and is connected by a rod $O^5$ with the spring-catch. When the body of fertilizer has been discharged, the front end of the apron which travels rearwardly strikes the arm $O^3$, thereby rocking the shaft and tripping the catch. The hand-lever is now thrown forward by its spring $O^6$, thereby rocking the shaft in the proper direction to stop the apron and the beater, the worm being raised out of mesh with the worm-wheel by the arm $i^7$ and the shifting-rod $i^6$ and the beater-clutch being disengaged by the arm $f^3$, connecting-rod $f^2$, bell-crank $f'$, link $f$, shifting-lever $e^2$, and shifting-rod $e'$.

The safety-board is operated by the following mechanisms: P represents laterally-projecting U-shaped arms which are secured to the board and extend over the sides of the box or body of the machine and connect with the front ends of two levers P'. The latter are arranged lengthwise of the machine, one on each side thereof, and are pivoted thereto at their rear ends. $p$ represents two cam-levers which bear against the under side of the levers P' and are pivoted to the sides of the box or body. These cam-levers are guided between depending flanges formed on the levers P' and are operated by a rock-shaft $p'$, to which they are connected by rods $p^2$ and rock-arms $p^3$. The rock-shaft $p'$ extends across the front of the machine in rear of the hand-lever O and is provided with a hand-lever $p^5$. When the latter is in the horizontal position (shown in Figs. 1 to 8) the safety-board is down in position in rear of the beater. By raising the lever the cam-levers $p$ are rocked on their pivots in the proper direction to move the gate-levers P' upward, whereby the gate is raised, as shown in Fig. 14. The gate is held in its elevated position by the hand-lever $p^5$, which strikes against the front of the hood and prevents the further rearward movement of the rock-arm $p^3$.

After the load has been distributed the feed-apron is returned to its initial position by an actuating mechanism, which is driven by frictional contact with one of the ground-wheels and which is constructed as follows: Q, Figs. 1, 2, and 5, represents a sprocket-wheel which is secured to the rear shaft $b^3$ of the feed-apron or bottom. Q' represents a frictional driving-roller which is journaled on a stud $q$, mounted on an arm $q'$, pivoted concentric with the rear shaft $b^3$ and provided with a sprocket-rim $q^2$. The latter is connected with the sprocket-wheel Q by a drive-chain $q^3$. The driving-roller Q' is constructed to be driven by contact with the tire of one of the rear wheels, preferably the right-hand-side wheel $A^2$, and has its face constructed for that purpose of material which has good frictional qualities—for instance, wooden staves, as represented in Figs. 2 and 3. This driving-roller stands normally near the tire or face of the rear wheel, as shown in Fig. 1, and is brought in contact with the wheel by a short forward movement imparted to the supporting-arm $q'$. This arm is operated by a rod $r$, which extends from the upper end of the arm to a rock-arm $r'$ on a rock-shaft $r^2$, arranged at the front of the machine. This shaft is provided with a foot-lever $r^3$, which is depressed for throwing the arm $q'$ forwardly and forcing the roller Q' against the wheel. The roller drives the sprocket-wheel Q and shaft $b^3$ and causes the apron to be returned to its initial position. When this has been accomplished, the driver releases the foot-lever and the roller is thrown out of contact with the wheel by a spring $s$, interposed between a collar $s'$ on the rod $r$, and a bracket $s^2$, which is secured to the side of the machine and through which the rod passes.

I claim as my invention—

1. A fertilizer-distributer comprising a receptacle for the material to be distributed, a beater arranged in front of said receptacle, means for actuating the beater with its rear portion in an upward direction and for delivering the material downwardly in front of the beater, and a feed mechanism for feeding the material in the receptacle forwardly to the beater, substantially as set forth.

2. A fertilizer-distributer comprising a receptacle for the material to be distributed, a beater arranged in front of said receptacle, means for actuating the beater with its rear portion in an upward direction, a hood extending forwardly over the beater and downwardly in front thereof and opening downwardly, and a feed mechanism for feeding the material in the receptacle forwardly to said beater, substantially as set forth.

3. A fertilizer-distributer comprising a body for the reception of the fertilizer, front and rear supporting-axles, a front delivery-opening arranged in the front portion of said body in rear of the front axle, a beater arranged in the front portion of said body over said opening, means for actuating the beater with its rear portion in an upward direction, and a hood extending forwardly over the beater and downwardly in front thereof to said delivery-opening, substantially as set forth.

4. In a fertilizer-distributer, the combination of a receptacle for the fertilizer, a beater, means for feeding the material in the receptacle to the beater, a hood extending over the beater and downwardly opposite the descending side of the beater, and a movable deflector arranged in the hood over the descending side of the beater and movable up and down in the hood, substantially as set forth.

5. In a fertilizer-distributer, the combination of a receptacle for the fertilizer, a beater, means for feeding the material in the receptacle to the beater, a hood extending over the beater and downwardly opposite the descending side of the beater, and a deflector arranged obliquely in the upper portion of the hood over the descending side of the beater for deflecting the material downwardly, substantially as set forth.

6. In a fertilizer-distributer, the combination of a receptacle for the fertilizer, a beater, means for feeding the material in the receptacle to the beater, a hood extending over the beater and downwardly opposite the descending side of the beater, a deflector arranged obliquely in the upper portion of the hood over the descending side of the beater for deflecting the material downwardly, and means for adjusting the inclination of the deflector, substantially as set forth.

7. In a fertilizer-distributer, the combination of a receptacle for the material to be distributed, a beater, means for feeding the material in the receptacle to the beater, a movable gate arranged between the receptacle and the beater, and a hood which extends over the beater and has its top provided with a movable portion which is adapted to move upwardly with the gate, substantially as set forth.

8. In a fertilizer-distributer, the combination of a receptacle for the material to be distributed, a beater arranged in front of said receptacle, means for feeding the material in the receptacle forwardly to the beater, a movable gate arranged adjacent to the rear side of the beater, and a hood which extends forwardly over the beater and has its top provided with a movable rear portion which is adapted to move upwardly with the gate, substantially as set forth.

9. In a fertilizer-distributer, the combination of a receptacle for the material to be distributed, ground-wheels on which the receptacle is supported, a feed mechanism in said receptacle, and a return mechanism for returning said feed mechanism to its initial position, actuated by contact with a ground-wheel, substantially as set forth.

10. In a fertilizer-distributer, the combination of a receptacle for the material to be distributed, ground-wheels on which the receptacle is supported, a feed mechanism in said receptacle, and a return mechanism comprising a frictional driving-roller adapted to be driven by contact with a ground-wheel, a support for said roller movable toward and from the ground-wheel, and mechanism connecting said roller with said feed mechanism, substantially as set forth.

11. In a fertilizer-distributer, the combination of a receptacle for the material to be distributed, ground-wheels on which the receptacle is supported, a movable bottom in said receptacle, a driving-shaft for said bottom provided with a sprocket-wheel, a frictional driving-roller adapted to be driven by contact with a ground-wheel and carrying a sprocket-wheel, a support for said roller movable toward and from said ground-wheel, and a drive-chain connecting said sprocket-wheels, substantially as set forth.

Witness my hand this 30th day of March, 1905.

JOSEPH S. KEMP.

Witnesses:
GEORGE CHAMBERLAIN,
MAJOR W. BAKEMANN.